United States Patent [19]
Lee

[11] Patent Number: 5,363,359
[45] Date of Patent: Nov. 8, 1994

[54] METHOD AND APPARATUS FOR GENERATING VELOCITY ERROR SIGNALS

[75] Inventor: Cheol-won Lee, Euiwang, Rep. of Korea

[73] Assignee: Samsung Electronics Co., Ltd., Suwon, Rep. of Korea

[21] Appl. No.: 135,622

[22] Filed: Oct. 14, 1993

[30] Foreign Application Priority Data

Mar. 31, 1993 [KR] Rep. of Korea ............ 93-5200

[51] Int. Cl.$^5$ ............................................. G11B 7/085
[52] U.S. Cl. ............................. 369/44.28; 369/32; 360/78.06
[58] Field of Search .................... 369/32, 44.25, 44.28, 369/44.29, 44.32, 44.35; 360/78.04–78.07; 318/592, 611, 618, 635, 799

[56] References Cited
U.S. PATENT DOCUMENTS

| | | | |
|---|---|---|---|
| 4,414,655 | 11/1983 | Shoji et al. | 369/44.32 X |
| 4,931,889 | 6/1990 | Osafune | 360/78.07 |
| 5,157,645 | 10/1992 | Takahara et al. | 369/44.28 |

Primary Examiner—W. R. Young
Attorney, Agent, or Firm—Leydig, Voit & Mayer

[57] ABSTRACT

A velocity error signal generation method for controlling a velocity by comprising an actual velocity signal from an actual velocity generator with a command velocity signal from a command velocity generator includes removing a direct current component from the actual velocity signal, adding the direct current component of the command velocity signal to the alternating current component of the actual velocity signal, adding a minute voltage to the command velocity signal, subtracting the minute voltage from the command velocity signal, comparing a first signal obtained by adding the direct current component of the command velocity signal to the alternating current component of the actual velocity signal with a second signal obtained by adding the minute voltage to the command velocity signal, comparing the first signal with a thrid signal obtained by subtracting the minute voltage from the command velocity signal, and determining whether the actual velocity or the command velocity will be used an an input for generating a velocity error signal. In a velocity generating apparatus for realizing the method, when the difference between the actual and command velocity signals is outside a predetermined range, the actual velocity is regarded as being erroneously measured and is then replaced with the command velocity to detect a velocity error, thereby enhancing the reliability of a control system.

6 Claims, 8 Drawing Sheets

FIG. 3

| STEP. | PROCESS |
|---|---|
| 30 | INITIAL STATE |
| 31 | REMOVE DC COMPONENT FROM ACTUAL VELOCITY |
| 32 | ADD DC COMPONENT OF COMMAND VELOCITY TO AC COMPONENT OF ACTUAL VELOCITY |
| 33 | ADD MINUTE VOLTAGE TO COMMAND VELOCITY VOLTAGE |
| 34 | SUBTRACT MINUTE VOLTAGE FROM COMMAND VELOCITY VOLTAGE |
| 35 | COMPARE SIGNAL OBTAINED FROM STEP 33 WITH ACTUAL VELOCITY SIGNAL OBTAINED FROM STEP 32 |
| 36 | COMPARE SIGNAL OBTAINED FROM STEP 34 WITH ACTUAL VELOCITY SIGNAL OBTAINED FROM STEP 32 |
| 37 | IF CONDITIONS 35&36 ARE BOTH FALSE, THE ACTUAL VELOCITY IS USED AS AN INPUT FOR GENERATING ERRORS, AND IF AT LEAST ONE CONDITION(35 OR 36) IS TRUE, THE COMMAND VELOCITY IS USED AS AN INPUT FOR GENERATING ERRORS. |

CONDITION (33)<(32)

CONDITION (34)>(32)

RESULTANT VELOCITY ERROR SIGNAL

METHOD AND APPARATUS FOR GENERATING VELOCITY ERROR SIGNALS

BACKGROUND OF THE INVENTION

The present invention relates to a velocity error signal generation method and the apparatus thereof, and, more particularly, to a method and apparatus for generating accurate velocity error signals, by replacing an undesired actual velocity with a command velocity when the undesired actual velocity is generated due to external noise or unexpected disturbances, in controlling a track traverse velocity for a magneto-optical disk drive.

Generally, in the field of control technology, when controlling the velocities of objects, a velocity error corresponds to the difference between a desired command velocity and an actual velocity generated in response to the command velocity, which is thereby used in the control of the object's velocity. That is, by subtracting the actual velocity from the command velocity, the obtained velocity error is used in a velocity control operation.

In most cases, accurate velocity errors can be obtained, but when the actual velocity is not accurately measured due to noise or other causes, incorrect velocity error signals are generated. When such an incorrect velocity error signal is directly used as a velocity control signal, accurate velocity control cannot be achieved.

FIG. 1 shows a schematic block diagram of the conventional velocity error generation apparatus. Signals from an actual velocity generator 10 and a command velocity generator 11 are input to a velocity error generation apparatus 12, which generates a velocity error signal by subtracting the actual velocity from the command velocity.

However, when the actual velocity error includes noise, an incorrect velocity signal is generated.

FIGS. 2A, 2B and 2C are waveform diagrams showing operations of the conventional velocity error generator with respect to an actual velocity signal which includes noise.

As shown in FIG. 2B wherein actual velocity voltage is shown, an incorrect signal 20 due to noise is included in a waveform of the actual velocity voltage signal. In this case, such a signal 20 due to the noise appears unchanged in a velocity error voltage signal (which is obtained by subtracting an actual velocity voltage as shown in FIG. 2B from a command velocity voltage as shown in FIG. 2A).

For example, the magneto-optical disk drive utilizes a light beam to find a user-desired target track with a track detection signal of an optical head which detects a precise information signal stored on a disk surface. Accordingly, the track detection signal can be incorrectly generated by defects in the disk surface, an offset detection flag region and a preformat region, by the sway of a portable magneto-optical disk drive, etc. As a result, incorrect velocity error signals are generated.

Thus, if velocity control is performed according to such an incorrect velocity error signal, the actual velocity deviates from a minute voltage difference range of a command velocity to be controlled, that is, a normal state range, to thereby make correct velocity control impossible. Accordingly, as an incorrect actual velocity is generated due to noise or unexpected disturbance, a velocity error generator which generates a correct velocity error signal is necessary.

SUMMARY OF THE INVENTION

Therefore, to solve the above defects, it is an object of the present invention to provide a method and apparatus for preventing an incorrect velocity signal from being generated, by replacing an undesired actual velocity with a command velocity when an undesired actual velocity is generated due to external noise or unexpected disturbance, and by adding a supplementary circuit to the conventional velocity generator.

To accomplish the above object of the present invention, there is provided a velocity error generation method for controlling a velocity by comparing an actual velocity signal from an actual velocity generator with a command velocity signal from a command velocity generator, said method comprising the steps of:

generating a comparison signal from the actual velocity signal;

generating a reference signal from the command velocity signal;

comparing the comparison signal with the reference signal; and determining whether the actual velocity signal or the command velocity signal will be used as an input for generating a velocity error.

Also, to accomplish the above object, there is provided a velocity error generating apparatus having an actual velocity generator and a command generator according to the present invention, the apparatus comprising:

comparator means for receiving an actual velocity signal from an actual velocity generator and a command velocity signal from a command velocity generator, and generating a predetermined output value by comparing the velocity signals;

selection means for selecting between the actual velocity signal and the command velocity signal, according to a predetermined output value from said comparator means; and a velocity error generator for generating a velocity error using the command velocity signal and the output of the selection means.

BRIEF DESCRIPTION OF THE DRAWINGS

The above object and other advantages of the present invention will become more apparent by describing in detail a preferred embodiment of the present invention with reference to the attached drawings in which:

FIG. 3 shows a flowchart diagram of a velocity error generation method according to the present invention;

DETAILED DESCRIPTION OF PREFERRED EMBODIMENTS

One embodiment of the present invention will be described in more detail with reference to the attached drawings.

Figure 1:
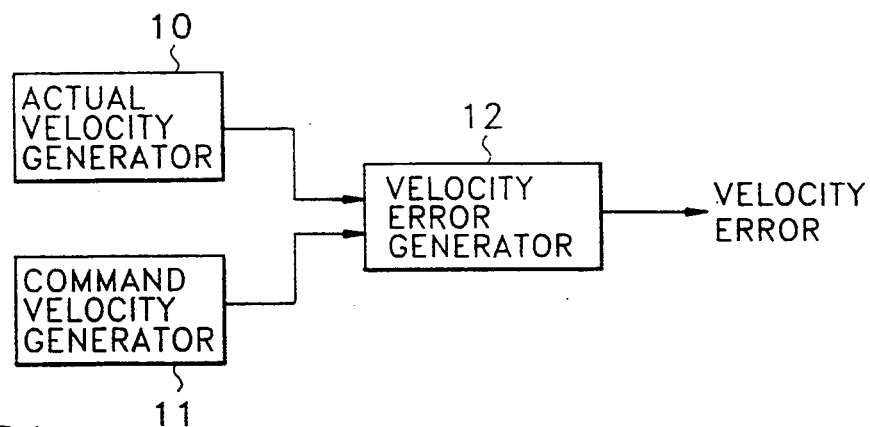
FIG. 1 shows a schematic block diagram of the conventional velocity error generation apparatus.
Figure 2A:
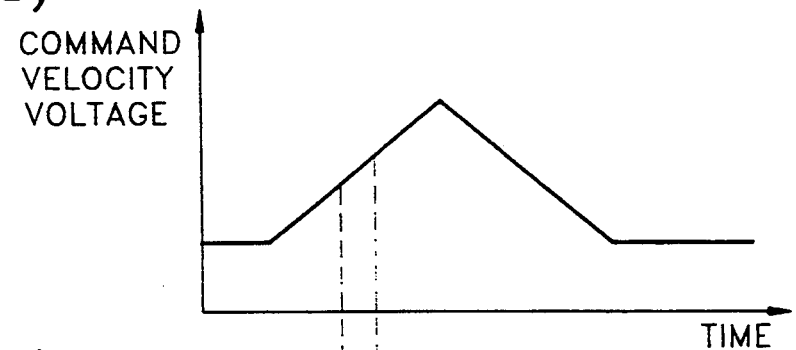
FIGS. 2A, 2B and 2C are output waveform diagrams showing operations of the conventional velocity error generator with respect to the actual velocity signal which includes noise.
Figure 2B:
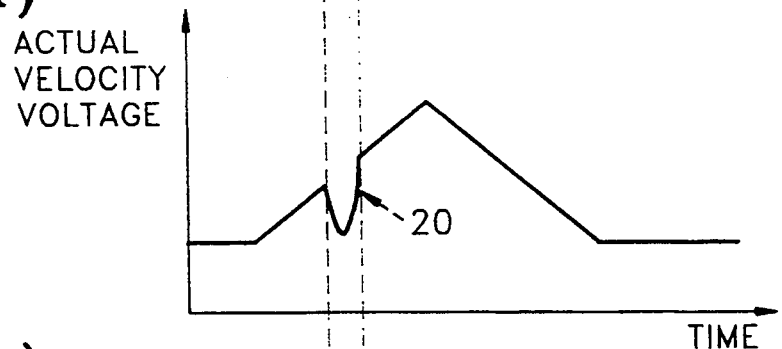
Figure 2C:
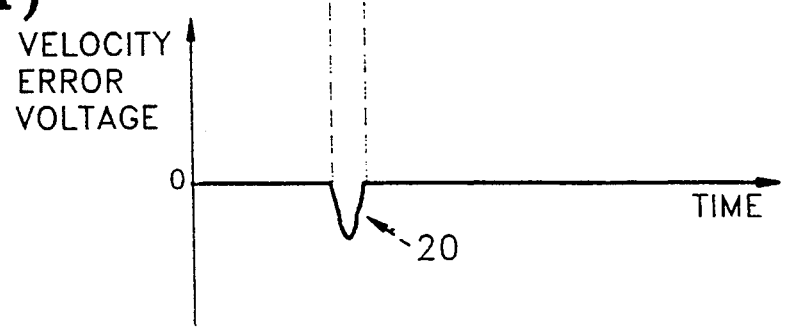
Figure 4:
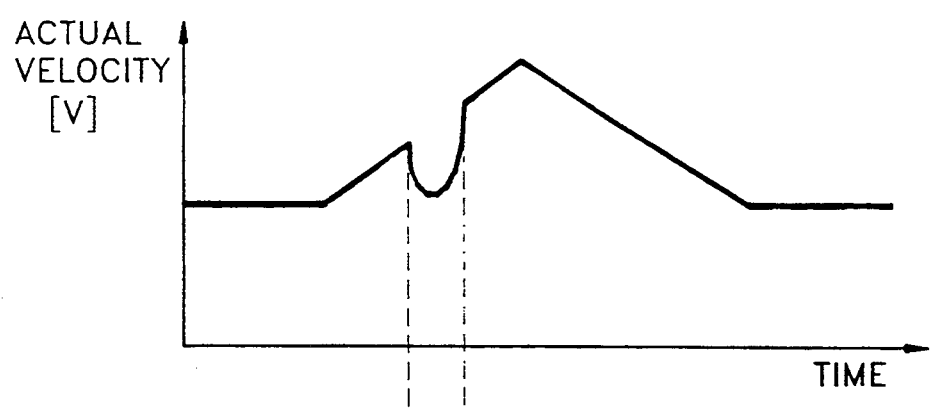
FIGS. 4 through 13 are voltage waveform diagrams corresponding to the respective steps of FIG. 3.
Figure 5:
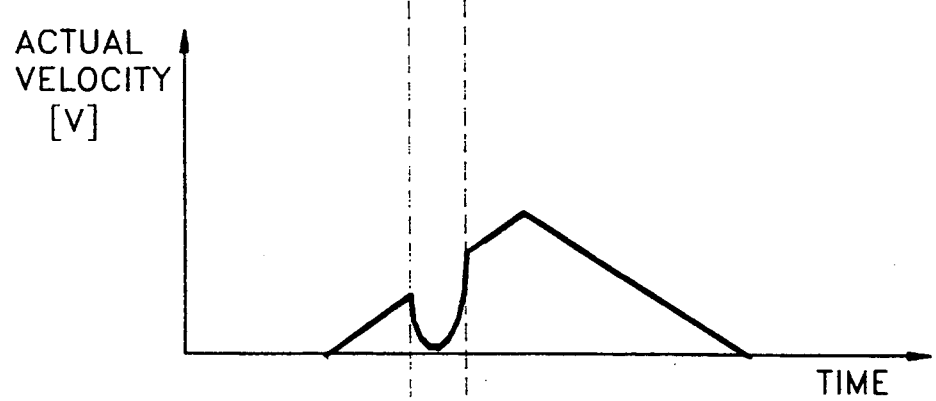
Figure 6:
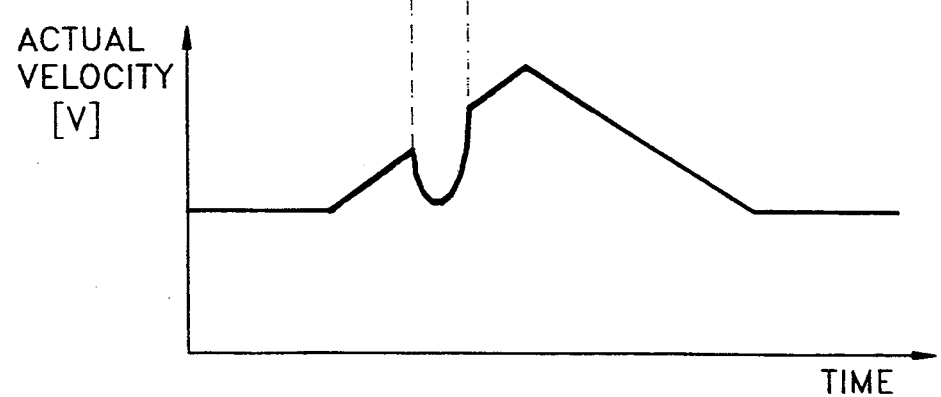
Figure 7:
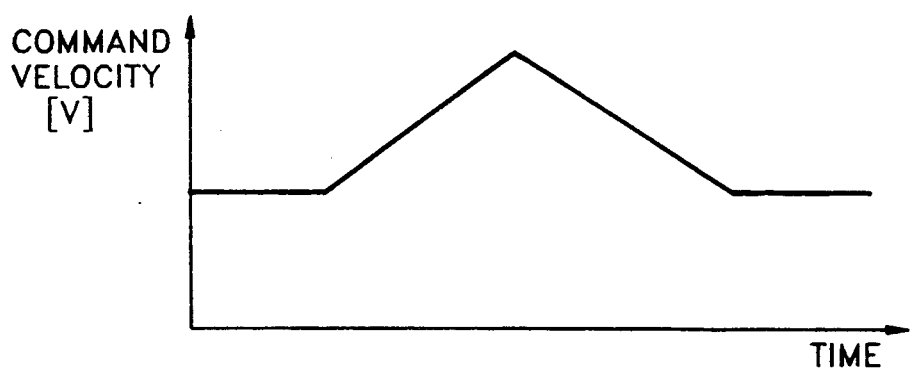
Figure 8:
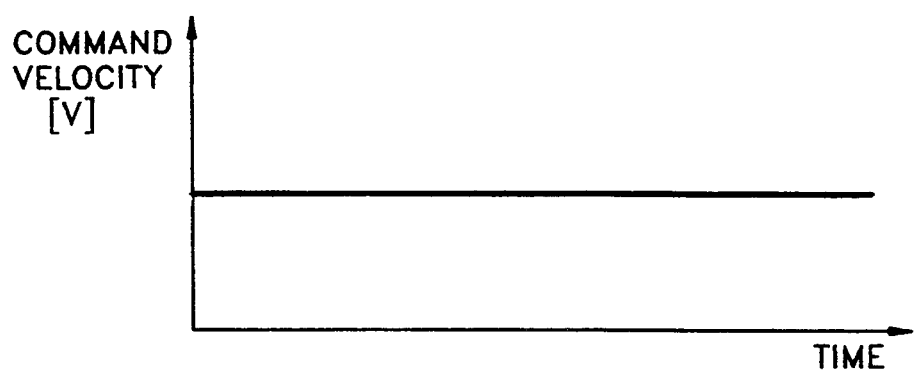

Referring to FIGS. 3 through 13 illustrating a velocity error generation method according to the present invention, an actual velocity and a command velocity at the initial state of step 30 are shown as waveform diagrams in FIG. 4. Then, at step 31 illustrated in FIG. 5, the direct current component is removed from the actual velocity. Then, at step 32 illustrated in FIG. 6, the direct current component of the command velocity is added to an alternating current component of the actual velocity. The command velocity and its direct current component are shown in FIGS. 7 and 8.

Figure 9:
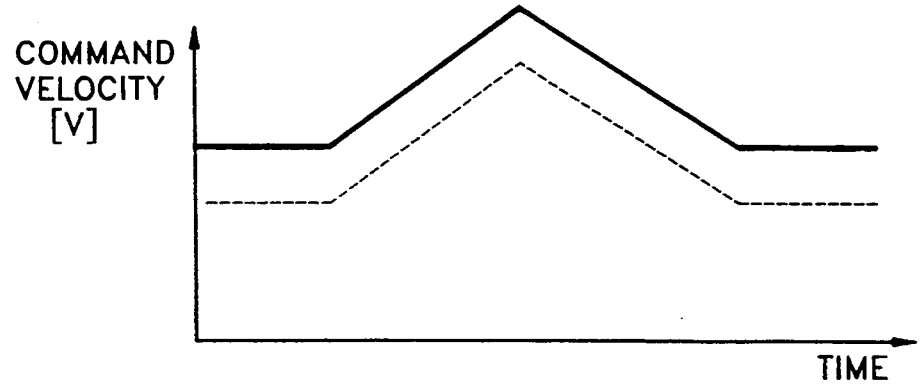
Figure 10:
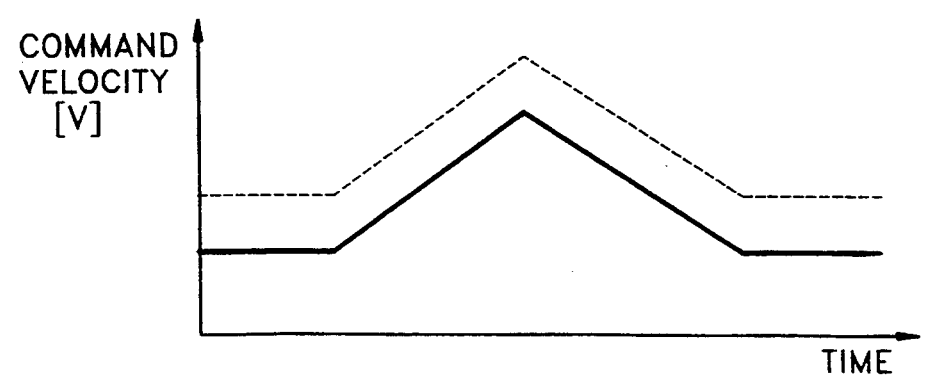

At step 33, shown in FIG. 9, a minute voltage is added to the command velocity voltage. At step 34, shown in FIG. 10, the minute voltage is subtracted from the command velocity voltage.

Figure 11:
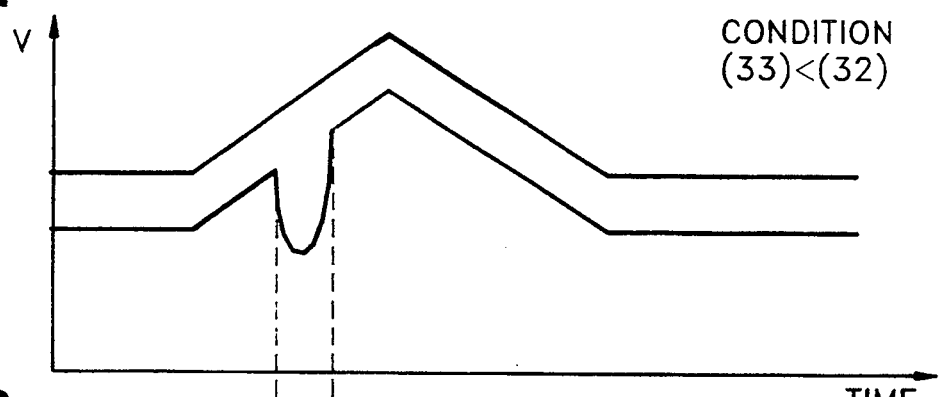
Figure 12:
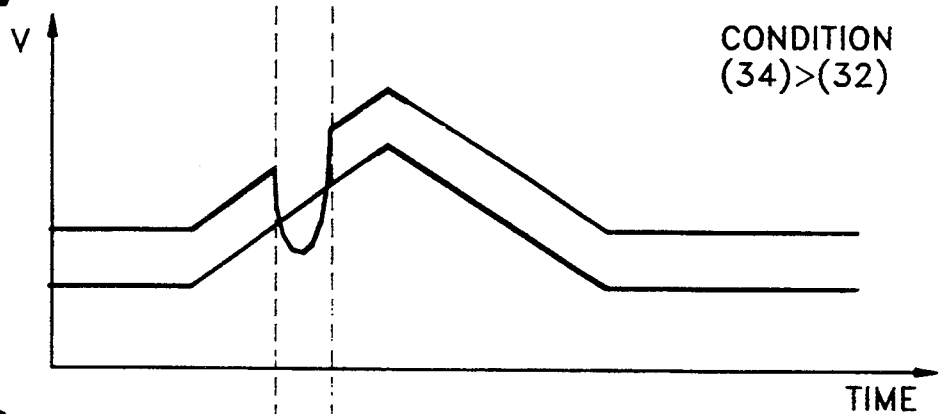

To check whether a first condition is met, i.e., that the actual velocity signal (obtained in step 32) is larger than the signal obtained in step 33, these two signals are compared at step 35 illustrated in FIG. 11. To check whether a second condition is met, i.e., that the actual velocity signal is smaller than the signal obtained in step 34, these two signals are compared at step 36 illustrated in FIG. 12.

Figure 13:
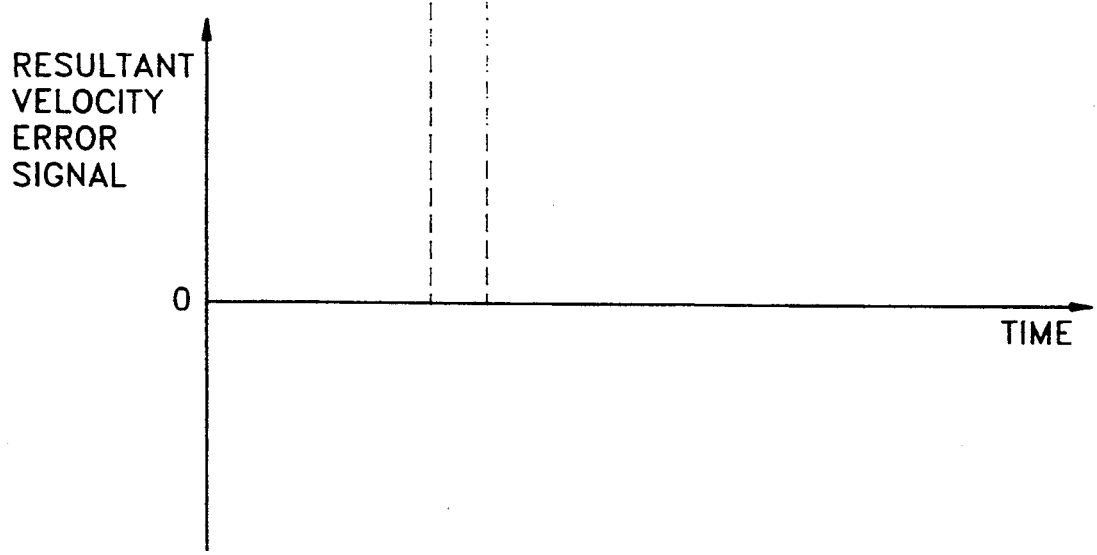

If the first and second conditions of steps 35 and 36 are false, the actual velocity is used as an input for generating an error. If at least one of two conditions is true, as in FIGS. 11 and 12 and as illustrated in FIG. 13, the command velocity is used as the input for generating the error. Accordingly, the velocity error signal is not influenced by the actual velocity signal due to noise or other unexpected disturbances, to thereby enable a correct velocity control to be obtained at step 37.

Figure 14:
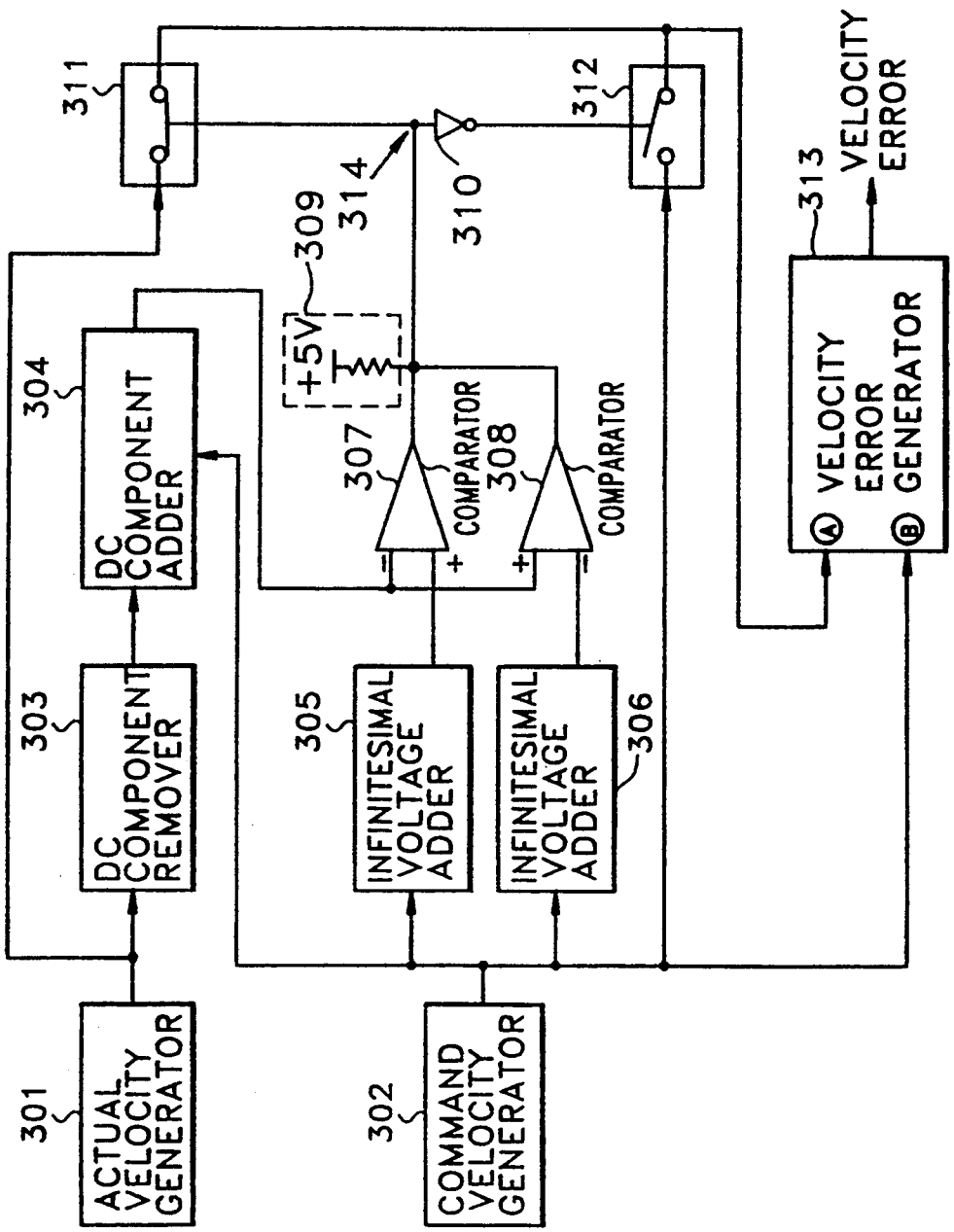
FIG. 14 is a block diagram of a velocity error generation apparatus according to the present invention.
Figure 15A:
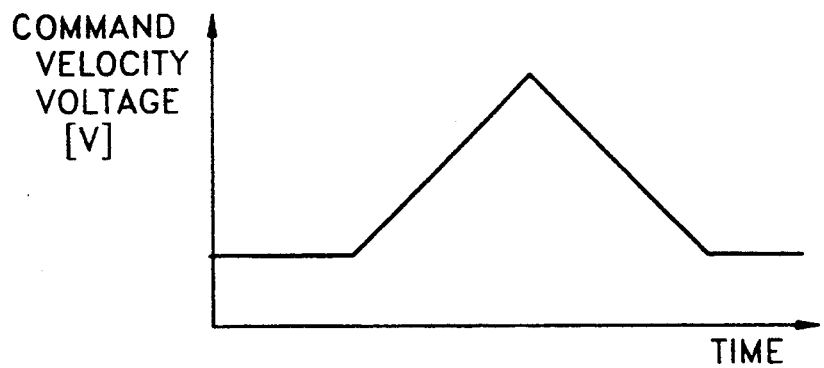
FIGS. 15A through 15D are output waveform diagrams of the respective elements of block diagram of FIG. 14.
Figure 15B:
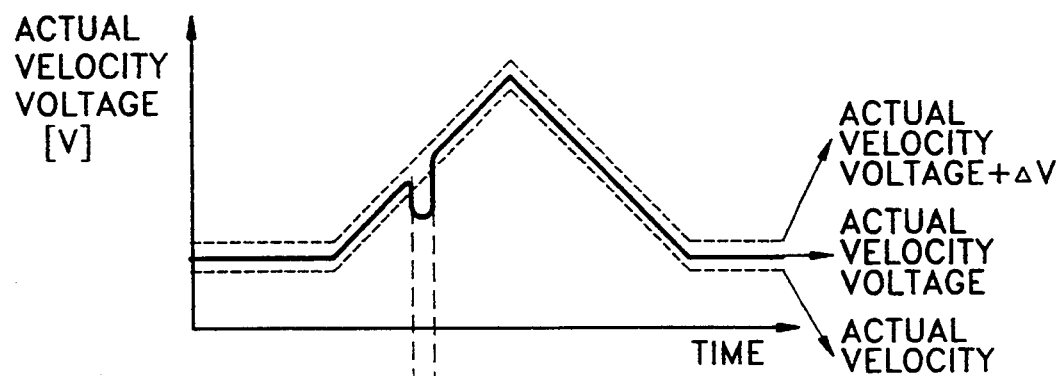
Figure 15C:
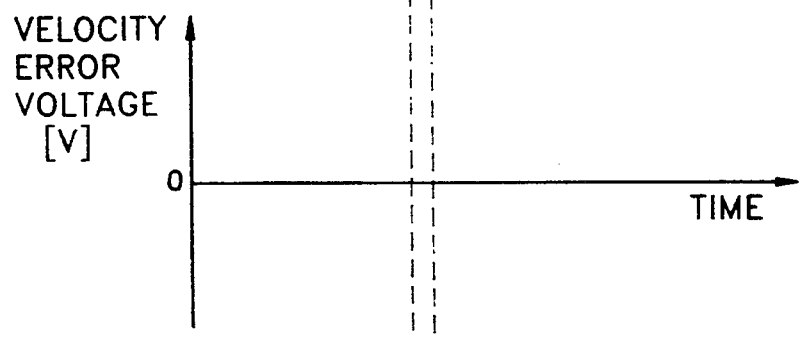
Figure 15D:
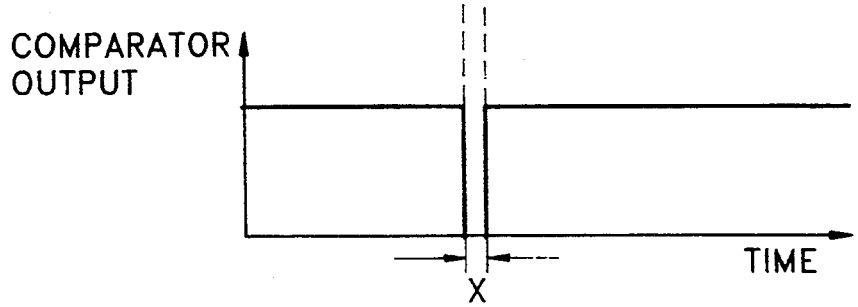

Also, FIG. 14 is a block diagram of the velocity error generation apparatus according to the present invention.

Referring to FIG. 14, an actual velocity signal from actual velocity generator 301 is input to direct current component remover 303. The output of direct current component remover 303 is input to direct current component adder 304, together with a command velocity signal from command velocity generator 302.

The command velocity signal is input to both a voltage adder 305 and a voltage subtractor 306.

A first signal from direct current adder 304 and a second signal from voltage adder 305 are input to comparator 307, and the first signal and a third signal of voltage subtractor 306 are input to comparator 308.

According to pull-up means 309 for supplying a switching control signal, the resultant signals of comparators 307 and 308 and pull-up means 309 are supplied to a control electrode of first switching means 311 or, through an inverter 310, to second switching means 312. Thus, in the case of a high level signal, first switching means 311 is turned on, and in the case of a low level signal, second switching means 312 is turned on.

FIGS. 15A through 15D are waveform diagrams for explaining the operation of FIG. 14. The operation is described below, together with the description of the construction of FIG. 14.

By comparing the second signal and the third signal which are obtained by adding and subtracting minute voltage $\Delta V$ with respect to the command velocity voltage, respectively, with the actual velocity voltage, if the actual velocity voltage is larger than the second signal or smaller than the third signal, the output of comparator 308 becomes a low level as represented as an interval X.

In case of the low level, the command velocity is selected in second switching means 312. Accordingly, at interval X, the command velocity signal is replaced with the actual velocity signal, and supplied to an input "a" of velocity error generator 313.

As a result, the velocity error signal at interval X is not influenced by the noise included in the actual velocity signal, so as to maintain the previous state.

Figure 16:
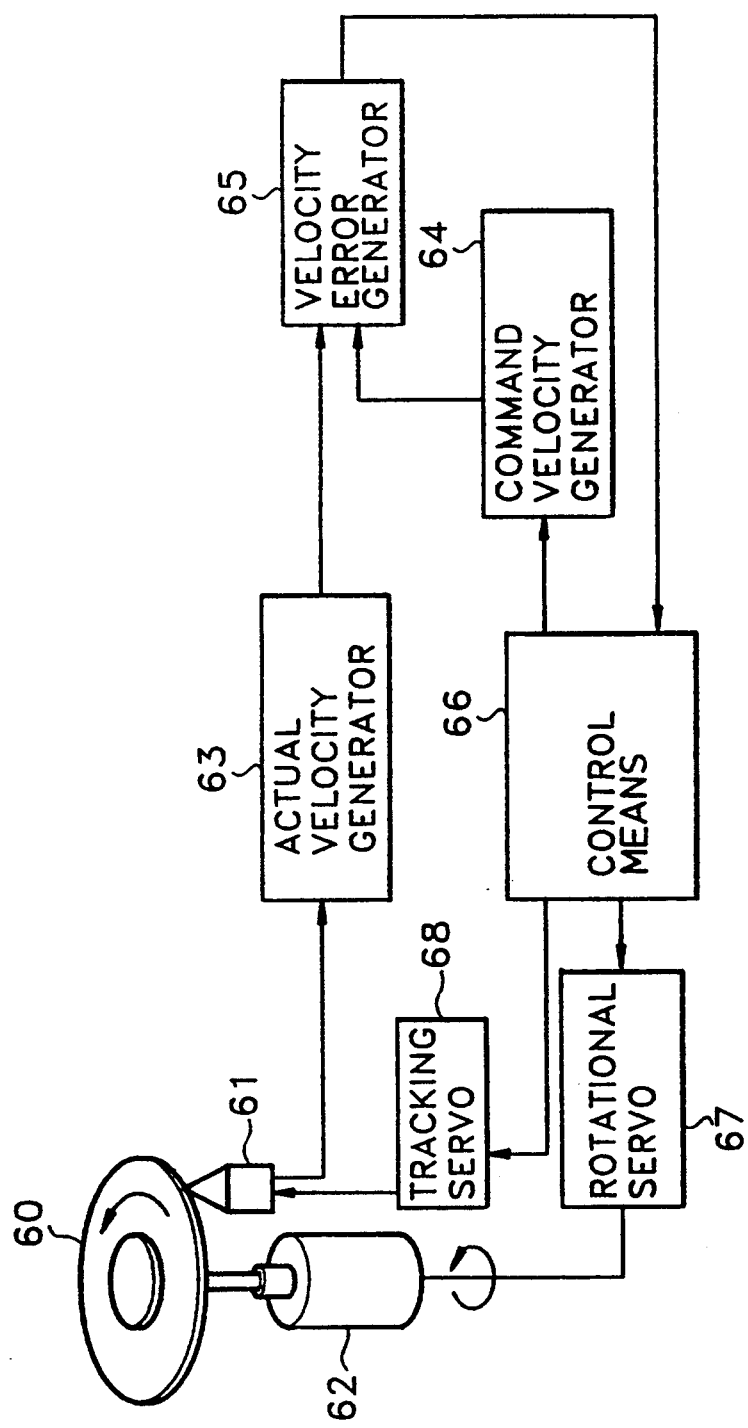
FIG. 16 is a block diagram of a magneto-optical disk drive system in which the velocity error generation apparatus according to the present invention is adopted.

FIG. 16 is a block diagram of a magneto-optical disk drive system in which the velocity error generation apparatus according to the present invention is used.

A spindle motor 62 for rotating a disk 60 in a magneto-optical disk drive system is connected to a rotational servo 67. A track traverse signal of an optical head 61 for picking up stored information from disk 60 is input to actual velocity generator 63. The actual velocity signal generated from actual velocity generator 63 is input to velocity error generation apparatus 65 according to the present invention.

Command velocity generator 64 inputs a command velocity signal to velocity error generation apparatus 65 according to the present invention, in response to a signal from control means 66.

The velocity error signal generated from velocity error generation apparatus 65 is applied to control means 66. The control means 66 controls tracking servo 68 according to the velocity error signal. Also, control means 66 transfers a signal to a rotational servo 67 to control spindle motor 62, thereby controlling rotational velocity of disk 60.

When optical head 61 is moved to a target track in a disk drive by applying a command velocity, the light beam passes through the tracks of disk 60. Here, a track traverse signal is generated, and its period measured, to ascertain actual velocity.

However, since the track traverse signal is distorted in the case of defects in the disk or in the offset detection flag area, the preformat area, etc., the amplitude of the track traverse signal becomes small. Accordingly, since the actual velocity cannot be exactly measured, velocity error generation apparatus 65 according to the present invention is applicable to a magneto-optical disk drive system, to thereby enable a correct velocity control.

As described above, in the velocity error generation method and the apparatus thereof according to the present invention, when the difference between the actual velocity and the command velocity is outside a predetermined range $\Delta V$ in a velocity control, the actual velocity is regarded as being erroneously measured. Then, the actual velocity is replaced with the command velocity to detect a velocity error, thereby enhancing the reliability of a control system.

What is claimed is:

1. A velocity error signal generation method for controlling a velocity by comparing an actual velocity signal from an actual velocity generator with a command velocity signal from a command velocity generator, said method comprising the steps of:

generating a comparison signal from an actual velocity signal;

generating a reference signal from a command velocity signal;

comparing the comparison signal with the reference signal; and determining which of the actual velocity signal and the command velocity signal will be used as an input for generating a velocity error signal in response to the result of the comparing step.

2. The velocity error signal generation method according to claim 1 wherein the comparison signal generating step comprises:

removing a direct current component from the actual velocity signal; and adding the direct current component of the command velocity signal to the alternating current component of the actual velocity signal.

3. The velocity error generation method according to claim 1, wherein said reference signal generating step comprises:

adding a minute voltage to the command velocity signal; and subtracting the minute voltage from the command velocity signal.

4. The velocity error signal generation method according to claim 1, wherein the comparing step comprises:

comparing a first signal obtained by adding the direct current component of the command velocity signal to the alternating current component of the actual velocity signal with a second signal obtained by adding a minute voltage to the command velocity signal; and comparing the first signal with a third signal obtained by subtracting the minute voltage from the command velocity signal.

5. A velocity error signal generating apparatus comprising:

an actual velocity signal generator for generating an actual velocity signal;

a command velocity signal generator for generating a command velocity signal;

comparator means receiving the actual velocity signal from said actual velocity signal generator and the command velocity signal from said command velocity signal generator for generating an output signal in response to comparing the actual velocity signal to the command velocity signal;

selection means for selecting between the actual velocity signal and the command velocity signal according to an output signal of said comparator means; and a velocity error signal generator for generating a velocity error signal using the command velocity signal and the signal selected by said selection means.

6. The velocity error signal generating apparatus according to claim 5 wherein said comparator means comprises:

first means for removing a direct current component from the actual velocity signal to produce a first signal;

second means for adding a direct current component of said command velocity signal to the first signal to produce a second signal;

a voltage adder for adding a minute voltage to the command velocity signal to produce a third signal;

a voltage subtractor for subtracting the minute voltage from the command velocity signal to produce a fourth signal;

a first comparator for comparing the second signal with the third signal to produce an output signal;

a second comparator for comparing the second signal with the fourth signal to produce an output signal; and pull-up means for supplying a switching control signal according to the output signals of said first and second comparators.

* * * * *